US009965052B2

(12) United States Patent
Coutts et al.

(10) Patent No.: US 9,965,052 B2
(45) Date of Patent: May 8, 2018

(54) ANTENNA FOR COMPUTER STYLUS (71) Applicant: Apple Inc., Cupertino, CA (US)

(72) Inventors: Gordon Coutts, Santa Clara, CA (US); Qingxiang Li, Mountain View, CA (US); Robert W. Schlub, Cupertino, CA (US); Yi Jiang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 590 days.

(21) Appl. No.: 14/307,257

(22) Filed: Jun. 17, 2014

(65) Prior Publication Data

US 2015/0363013 A1    Dec. 17, 2015

(51) Int. Cl.
*G06F 3/0354* (2013.01)
*H01Q 1/22* (2006.01)
*H01Q 1/44* (2006.01)
*H01Q 9/42* (2006.01)

(52) U.S. Cl.
CPC ....... *G06F 3/03545* (2013.01); *H01Q 1/2258* (2013.01); *H01Q 1/44* (2013.01); *H01Q 9/42* (2013.01)

(58) Field of Classification Search
CPC ..... H01Q 1/2258; H01Q 1/44; G06F 3/03545
See application file for complete search history.

(56) References Cited

U.S. PATENT DOCUMENTS

| 6,262,684 | B1 | 7/2001 | Stewart et al. |
| 7,646,347 | B2 | 1/2010 | Ying |
| 7,656,355 | B2 | 2/2010 | Hsin |
| 8,028,921 | B2 | 10/2011 | Silverbrook et al. |
| 2008/0094292 | A1 | 4/2008 | Su |
| 2011/0133997 | A1 | 6/2011 | Lee |
| 2013/0100022 | A1* | 4/2013 | Thompson ............... G06F 3/033 345/163 |
| 2013/0181879 | A1* | 7/2013 | Lin .......................... H01Q 1/48 343/843 |
| 2013/0207925 | A1 | 8/2013 | Ryshtun et al. |

(Continued)

FOREIGN PATENT DOCUMENTS

WO    2010128942    11/2010

OTHER PUBLICATIONS

Jiang et al., U.S. Appl. No. 14/792,516, filed Jul. 6, 2015.

*Primary Examiner* — Jessica Han
*Assistant Examiner* — Amal Patel
(74) *Attorney, Agent, or Firm* — Treyz Law Group, P.C.; G. Victor Treyz; Michael H. Lyons (57) ABSTRACT

A computer stylus may have an elongated body with a metal tube that serves as an antenna ground for an antenna. An antenna resonating element for the antenna may be formed from metal traces that wrap around a longitudinal axis for the elongated body. The antenna may be an inverted-F antenna. A ground antenna feed terminal for the inverted-F antenna may be coupled to the metal tube with a sheet metal member, conductive fabric, and solder. A clip may run along a side of the elongated body at a location that does not overlap the metal traces of the antenna resonating element. The antenna may be fed at a location on an opposing side of the elongated body from the clip. Antenna signals from the inverted-F antenna may be reflected towards the tip by metal structures at the end of the elongated body opposing the tip.

22 Claims, 11 Drawing Sheets

(56) References Cited

U.S. PATENT DOCUMENTS

| | | | |
|---|---|---|---|
| 2013/0241795 A1* | 9/2013 | Sung | H01Q 1/50 343/861 |
| 2015/0116291 A1* | 4/2015 | Leung | G06F 3/03545 345/179 |
| 2015/0138024 A1 | 5/2015 | Kalistaja et al. | |

* cited by examiner

ANTENNA FOR COMPUTER STYLUS

BACKGROUND

This relates generally to wireless communications circuitry and, more particularly, to wireless communications circuitry for elongated wireless devices such as computer styluses.

It can be challenging to form wireless circuitry for electronic equipment. For example, it can be difficult to incorporate wireless components such as antennas into compact portable devices such as tablet computer styluses. If care is not taken, the presence of conductive structures will adversely affect antenna performance. Poor antenna performance can lead to the use of increased transceiver power and reduced battery life. Poor antenna performance can also degrade wireless functionality.

It would therefore be desirable to be able to provide improved wireless circuitry for wireless devices such as computer styluses.

SUMMARY

A computer stylus may have an elongated body. A tip may be located at one end of the elongated body and may be configured to supply input to a capacitive touch screen. A metal connector and other metal structures may be located at an opposing end of the elongated body.

A metal tube in the elongated body may serve as an antenna ground for an antenna. An antenna resonating element for the antenna may be formed from metal traces that wrap around the elongated body at a location between the metal structures at the end of the elongated body and the metal tube.

The antenna may be an inverted-F antenna and may have a positive antenna feed terminal coupled to a resonating element arm in the metal traces and a ground antenna feed terminal. The ground antenna feed terminal may be coupled to the metal tube using a sheet metal member, conductive fabric, and solder.

A clip may run along part of the length of the elongated body at a location that does not overlap the metal traces of the antenna resonating element. The positive and ground antenna feed terminals may be located on an opposing side of the elongated body from the clip. Antenna signals from the inverted-F antenna may be reflected towards the tip by the metal structures at the end of the elongated body.

DETAILED DESCRIPTION

Figure 1:
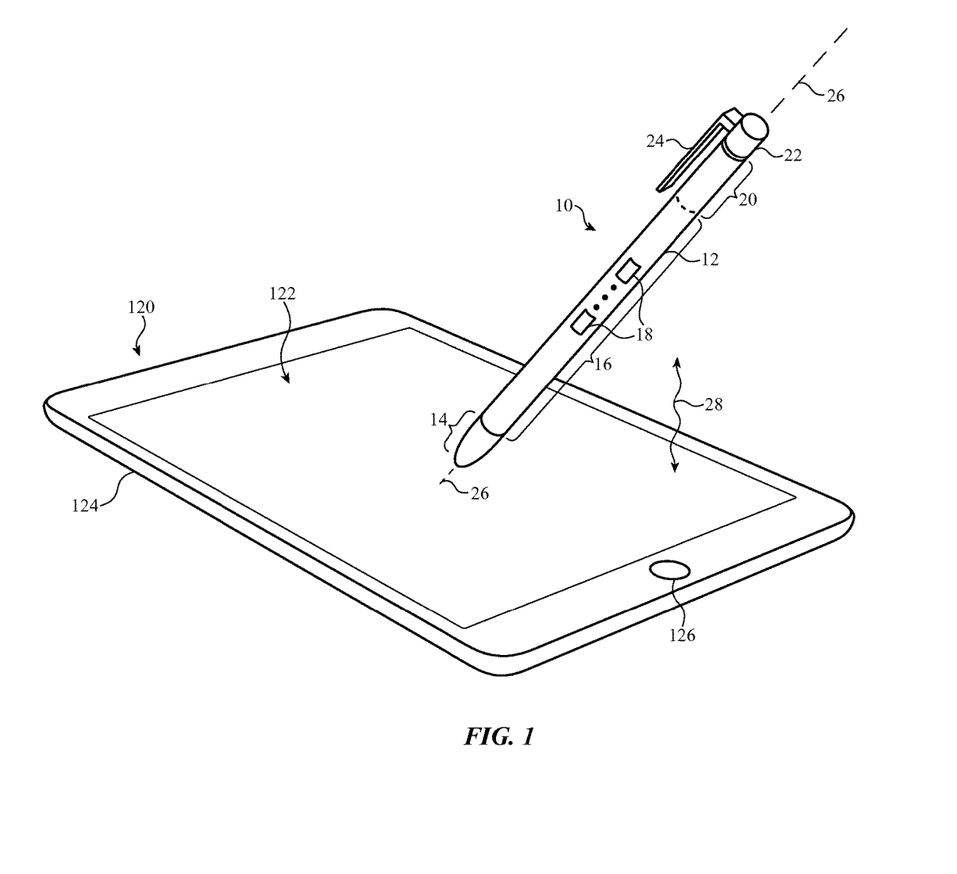
FIG. 1 is a perspective view of an illustrative computer and associated computer stylus in accordance with an embodiment.

A system that includes electronic equipment that communicates wirelessly is shown in FIG. 1. The equipment of FIG. 1 includes electronic device 120 and electronic device 10. Electronic equipment such as devices 120 and 10 may, in general, be computing devices such as laptop computers, computer monitors containing embedded computers, tablet computers, cellular telephones, media players, or other handheld or portable electronic devices, smaller devices such as wrist-watch devices, pendant devices, headphone or earpiece devices, devices embedded in eyeglasses or other equipment worn on a user's head, or other wearable or miniature devices, televisions, computer displays that do not contain embedded computers, gaming devices, navigation devices, embedded systems such as a systems in which electronic equipment is mounted in kiosks or automobiles, computer accessories such as touch pads, computer mice, computer styluses, or other electronic accessories, equipment that implements the functionality of two or more of these devices, or other electronic equipment. In the illustrative configuration of FIG. 1, which is sometimes described herein as an example, device 120 is a tablet computer or other device with a touch screen and device 10 is a computer stylus. When a drawing program is running on tablet computer 120, a user can use stylus 10 to draw on tablet computer 120 and to provide other input to tablet computer 120.

Tablet computer 120 may include a housing such as housing 124 in which display 122 is mounted. Input-output devices such as button 126 may be used to supply input to tablet computer 120. Display 122 may be a capacitive touch screen display or a display that includes other types of touch sensor technology. The touch sensor of display 122 may be configured to receive input from stylus 10.

Stylus 10 may have a cylindrical shape or other elongated body that extends along longitudinal axis 26. The body of stylus 10 may be formed from metal and/or plastic tubes and other elongated structures. Stylus 10 and tablet computer 120 may contain wireless circuitry for supporting wireless communications via wireless communications link 28. As an example, stylus 10 may supply wireless input to tablet computer 120 via link 28 (e.g., information on settings in a drawing program or other software running on tablet computer 120, input to select a desired on-screen option, input to supply tablet computer 120 with a touch gesture such as a stylus flick, input to draw a line or other object on display 122, input to move or otherwise manipulate images displayed on display 122, etc.).

Stylus 10 may have a tip such as tip 14. Tip 14 may contain a conductive elastomeric member that is detected by the capacitive touch sensor of display 122. If desired, tip 14 may contain active electronics (e.g., circuitry that transmits signals that are capacitively coupled into the touch sensor of display 122 and that are detected as touch input on the touch sensor).

Shaft portion 16 of stylus 10 may couple tip 14 of stylus 10 to opposing end 22 of stylus 10. End 22 may contain a conductive elastomeric member, active electronics (e.g., circuitry that transmits signals that are capacitively coupled into the touch sensor of display 122 and that are detected as touch input on the touch sensor), buttons, a metal connector that mates with an external plug, or other input-output components. The structures of end 22 may be formed from metal.

A force sensor may be incorporated into tip 14 and/or opposing end 22 of stylus 10. A force sensor may be used to measure how forcefully a user is pressing stylus 10 against the outer surface of display 122. Force data may then be wirelessly transmitted from stylus 10 to tablet 120 so that the thickness of a line that is being drawn on display 122 can be adjusted accordingly or so that tablet 120 may take other suitable action.

A clip such as clip 24 may be used to attach stylus 10 to a user's shirt pocket or other object. Clip 24 may run along the side of the elongated body of stylus 10. Clip 24 may be formed from a strip of flexible material such as springy metal and may be attached to stylus 10 at end 22. End 22 may have a removable cap, a data port connector to receive a cable (e.g., a cable that supplies power signals for charging a battery in stylus 10 and/or that supplies digital data), input-output devices (e.g., a button and/or a light-emitting diode or other light-based output device), or other components (e.g., metal structures).

Components such as components 18 may be formed on stylus 10 (e.g., on shaft 16 or elsewhere). Components 18 may include buttons, touch sensors, and other components for gathering input, light-emitting diodes or other components for producing output, etc.

Stylus 10 may include a metal tube or other conductive components in shaft portion 16. The metal tube or other structures in stylus 10 may serve as an antenna ground for an antenna. An antenna resonating element for the antenna may be formed from metal traces on a printed circuit or other conductive structures. The antenna resonating element may be located in region 20 of stylus 10 between the metal tube and the metal structures of end 22 or may be located in another suitable portion of stylus 10.

Figure 2:
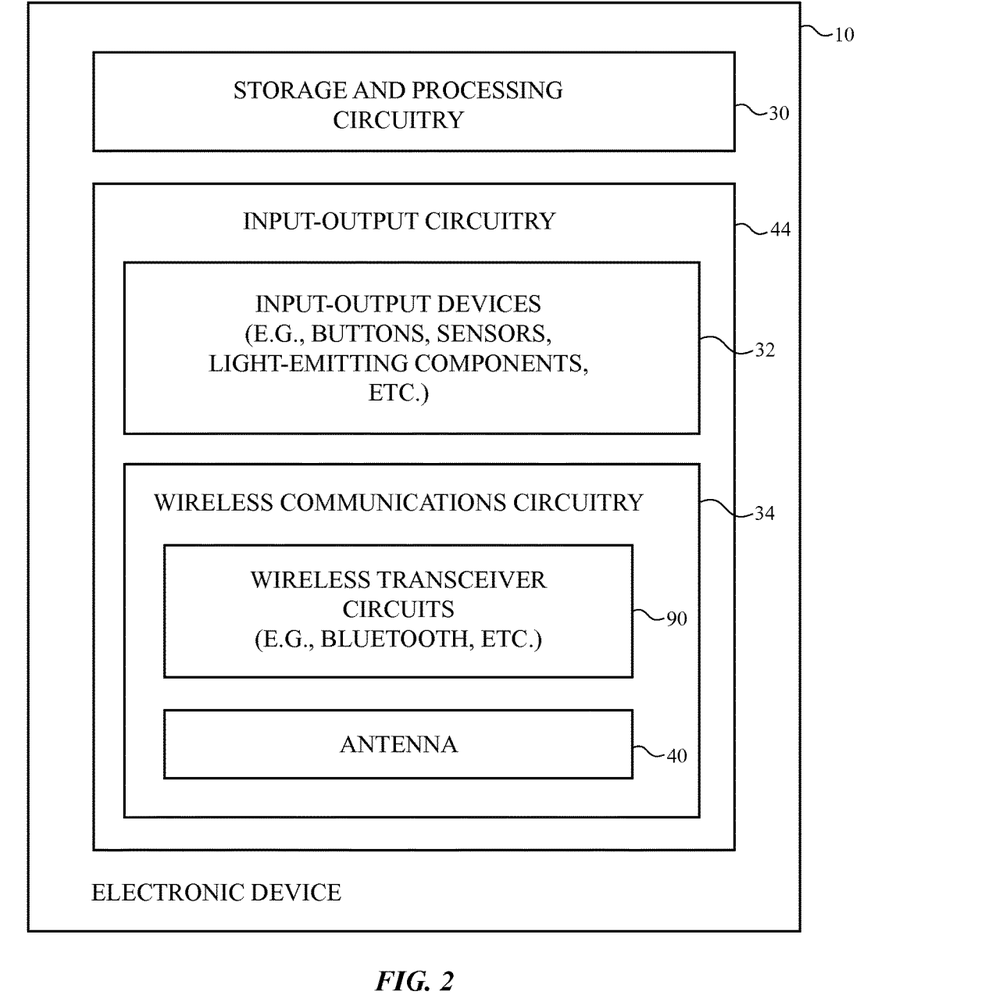
FIG. 2 is a schematic diagram of an illustrative stylus with wireless communications circuitry in accordance with an embodiment.

A schematic diagram showing illustrative components that may be used in stylus 10 is shown in FIG. 2. As shown in FIG. 2, stylus 10 may include control circuitry such as storage and processing circuitry 30. Storage and processing circuitry 30 may include storage such as nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of stylus 10. This processing circuitry may be based on one or more microprocessors, microcontrollers, digital signal processors, baseband processor integrated circuits, application specific integrated circuits, etc.

Storage and processing circuitry 30 may be used to run software on stylus 10. The software may process input from buttons, sensors, and other input components. The software may also be used to provide output to a user (e.g., using light-emitting-diodes or other output components such as components 18 of FIG. 1). To support interactions with external equipment such as tablet computer 120, storage and processing circuitry 30 and other circuitry in stylus 10 may be used in implementing communications protocols. Communications protocols that may be implemented in stylus 10 include protocols for short-range wireless communications links such as the Bluetooth® protocol. If desired, other types of wireless communications links may be supported. The use of Bluetooth communications is merely illustrative.

Stylus 10 may include input-output circuitry 44. Input-output circuitry 44 may include input-output devices 32. Input-output devices 32 may be used to allow data to be supplied to stylus 10 and to allow data to be provided from stylus 10 to external devices such as tablet computer 120. Input-output devices 32 may include user interface devices, data port devices, and other input-output components. For example, input-output devices 32 may include touch screens, displays without touch sensor capabilities, buttons, joysticks, scrolling wheels, touch pads, microphones, cameras, speakers, status indicators, light sources, audio jacks and other audio port components, digital data port devices, light sensors, accelerometers or other components that can detect motion and stylus orientation relative to the Earth, capacitance sensors, proximity sensors (e.g., a capacitive proximity sensor and/or an infrared proximity sensor), magnetic sensors, and other sensors and input-output components.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals.

Wireless communications circuitry 34 may include radio-frequency transceiver circuitry 90 for handling wireless communications in the 2.4 GHz Bluetooth® communications band or other suitable communications bands. Bluetooth signals or other wireless signals may be transmitted and/or received by transceiver circuitry 90 using one or more antennas such as antenna 40. Antennas in wireless communications circuitry 34 may be formed using any suitable antenna types. For example, antennas for stylus 10 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of the antennas in stylus 10 may be cavity-backed antennas.

Transmission line paths may be used to couple antenna 40 to transceiver circuitry 90. Transmission lines in stylus 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

Figure 3:
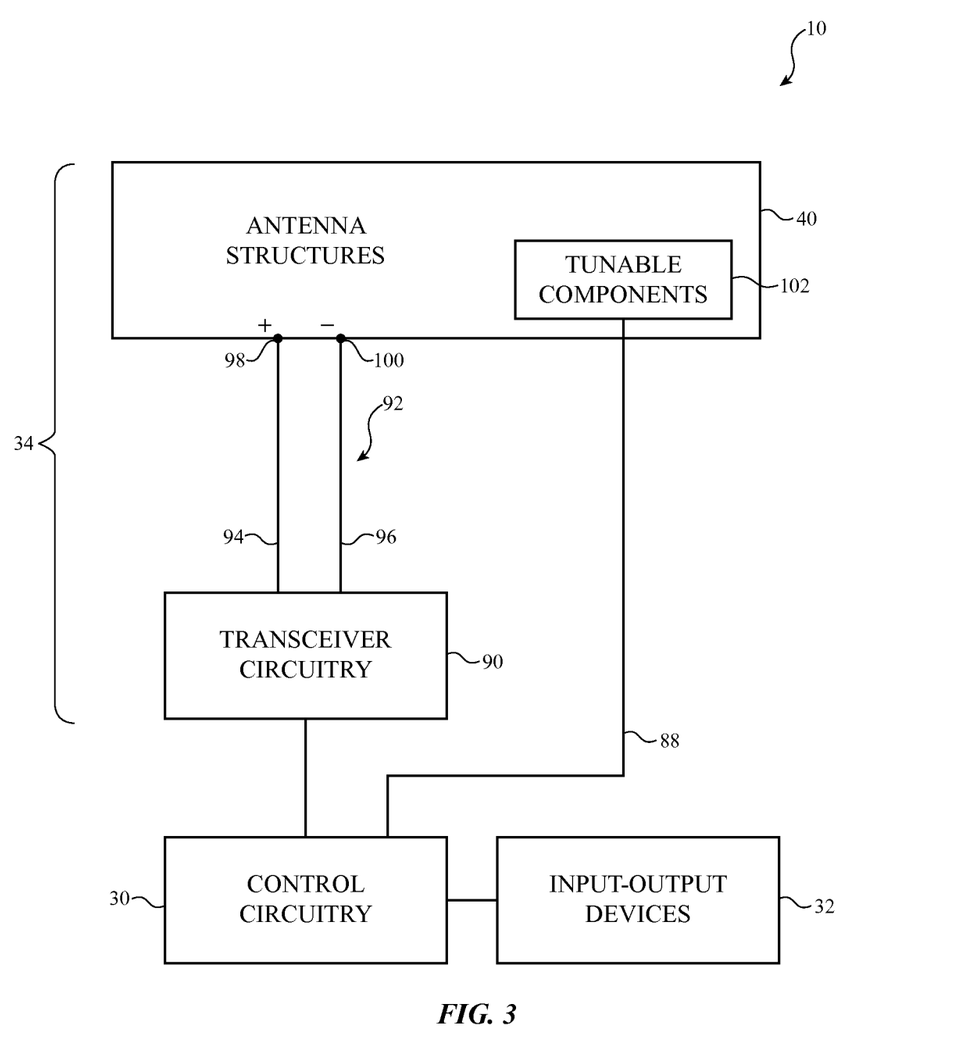
FIG. 3 is a diagram of illustrative wireless circuitry for use in a stylus in accordance with an embodiment.

As shown in FIG. 3, transceiver circuitry 90 in wireless circuitry 34 may be coupled to antenna 40 using paths such as path 92. Wireless circuitry 34 may be coupled to control circuitry 30. Control circuitry 30 may be coupled to input-output devices 32. Input-output devices 32 may supply output from stylus 10 and may receive input from sources that are external to stylus 10.

To provide antenna 40 with the ability to cover communications frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components 102 to tune antenna 40 over communications bands of interest. Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of stylus 10, control circuitry 30 may issue control signals on one or more paths such as path 88 that adjust inductance values, capacitance values, or other parameters associated with tunable components 102, thereby tuning antenna 40 to cover desired communications bands. Configurations in which antenna 40 is free of tunable components may also be used.

Path 92 may include one or more transmission lines. As an example, signal path 92 of FIG. 3 may be a transmission line having a positive signal conductor such as line 94 and a ground signal conductor such as line 96. Lines 94 and 96 may form parts of a coaxial cable or a microstrip transmission line (as examples). A matching network formed from components such as inductors, resistors, and capacitors may be used in matching the impedance of antenna 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna 40.

Transmission line 92 may be coupled to antenna feed structures associated with antenna 40. As an example, antenna 40 may form an inverted-F antenna, a slot antenna, a hybrid inverted-F slot antenna or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 92. Other types of antenna feed arrangements may be used if desired. The illustrative feeding configuration of FIG. 3 is merely illustrative.

Figure 4:
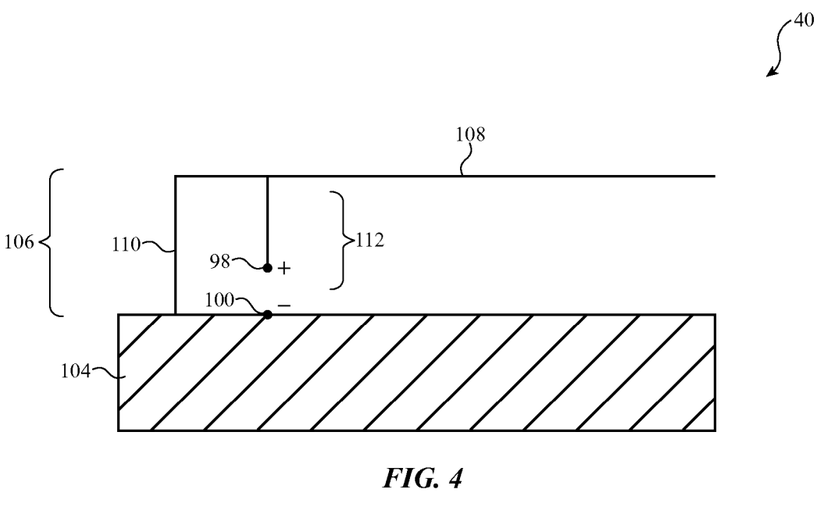
FIG. 4 is a diagram of an illustrative antenna for a stylus in accordance with an embodiment.

FIG. 4 is a diagram of illustrative inverted-F antenna structures that may be used in implementing antenna 40 for stylus 10. Inverted-F antenna 40 of FIG. 4 has antenna resonating element 106 and antenna ground 104. Antenna resonating element 106 may have a main resonating element arm such as arm 108. The length of arm 108 may be selected so that antenna 40 resonates at desired operating frequencies. For example, the length of arm 108 may be a quarter of a wavelength at a desired operating frequency for antenna 40 (e.g., 2.4 GHz). Antenna 40 may also exhibit resonances at harmonic frequencies.

Main resonating element arm 108 may be coupled to ground 104 by return path 110. Antenna feed 112 may include positive antenna feed terminal 98 and ground antenna feed terminal 100 and may run parallel to return path 110 between arm 108 and ground 104. If desired, inverted-F antennas such as illustrative antenna 40 of FIG. 4 may have more than one resonating arm branch (e.g., to create multiple frequency resonances to support operations in multiple communications bands) or may have other antenna structures (e.g., parasitic antenna resonating elements, tunable components such as components 102 of FIG. 3 to support antenna tuning, etc.). Antenna 40 of FIG. 4 may be a planar inverted-F antenna (e.g., arm 108 may have planar metal structures that run into the page in the orientation of FIG. 4) or may be formed from non-planar structures. In mounting antenna 40 in stylus 10, the structures of antenna 40 may be curved. For example, ground 104 and/or resonating element 106 may be formed from metal that wraps around longitudinal axis 26 of stylus 10.

Figure 5:
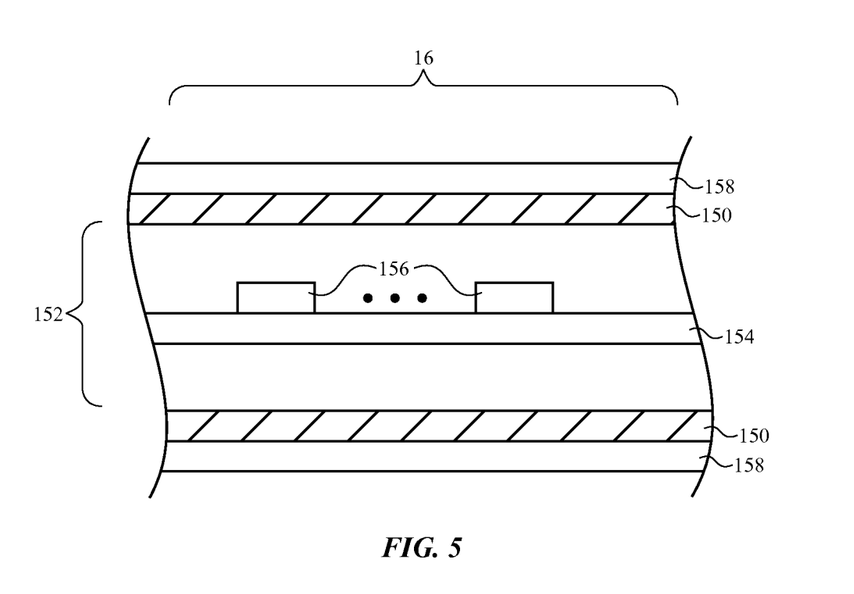
FIG. 5 is a cross-sectional side view of a portion of the elongated body of a stylus in accordance with an embodiment.

The housing of stylus 10 may be formed from metal, plastic, carbon-fiber composites and other fiber composites, glass, ceramic, other materials, and combinations of these materials. A cross-sectional side view of a section of shaft 16 of the elongated body of stylus 10 is shown in FIG. 5. As shown in FIG. 5, shaft 16 may include concentric cylindrical tubes such as inner metal tube 150 and outer plastic tube 158. Inner metal tube 150 and outer plastic tube 158 may be cylindrical tubes or other hollow shaft members (e.g., tubes with triangular or square cross-sectional shapes, etc.). Hollow interior 152 of inner tube 150 may be used to house components 156 (e.g., storage and processing circuitry 30 and input-output circuitry 44 of FIG. 2). Components 156 may include integrated circuits, sensors, input-output components, a battery, and other components that have been soldered or otherwise coupled to a substrate such as substrate 154. Substrate 154 may be a printed circuit (e.g., a flexible printed circuit such as a layer of polyimide or a sheet of other flexible polymer or a rigid printed circuit board such as a printed circuit board formed from fiberglass-filled epoxy or other rigid printed circuit board material), a plastic carrier, or other substrate. Outer tube 158 may be a plastic sheath that slides onto the outside of metal tube 150, may be molded plastic or other plastic coating that is formed on the exterior of tube 150, or may be other exterior plastic structures.

Figure 6:
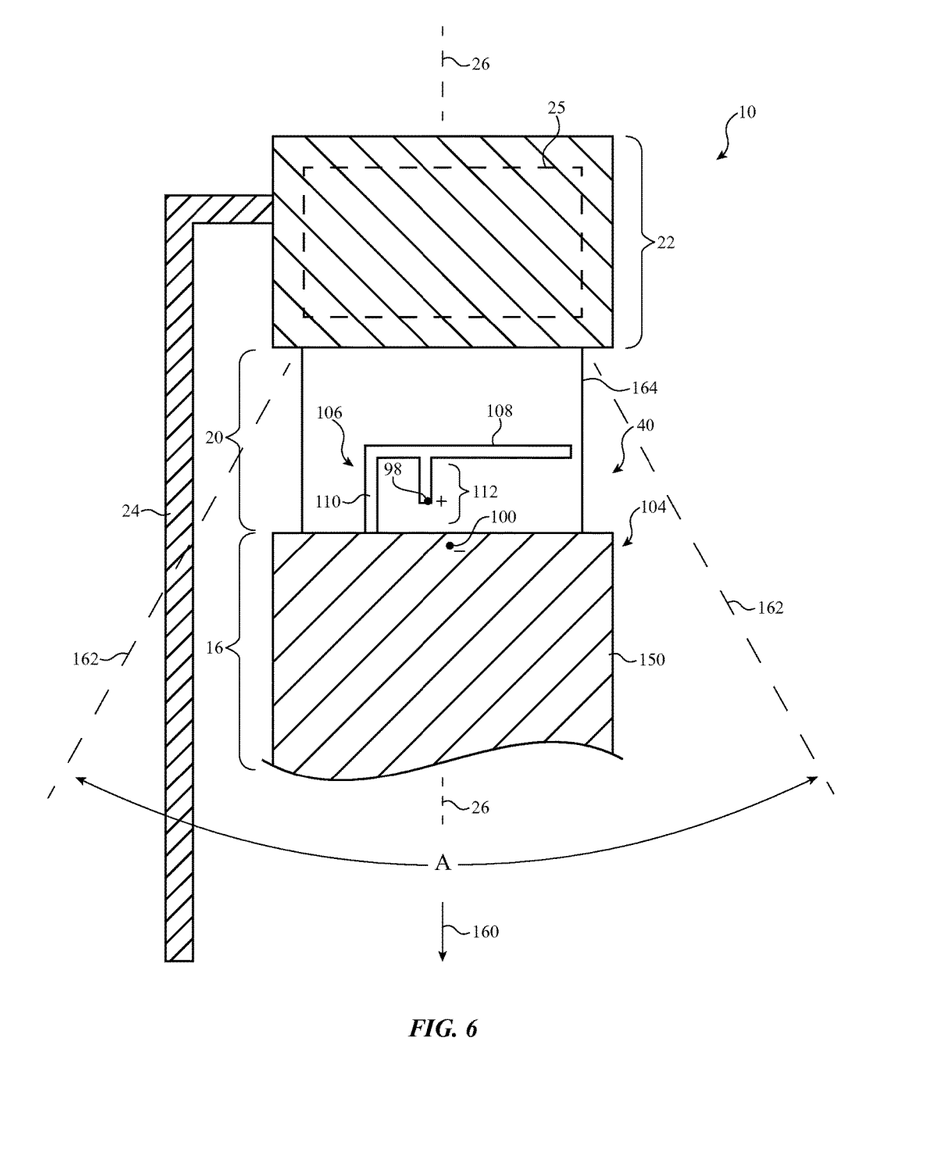
FIG. 6 is a side view of the upper end of a stylus in accordance with an embodiment.

If desired, portions of stylus 10 such as region 20 between shaft portion 16 and end 22 may be devoid of metal tube 150. An antenna resonating element for antenna 40 may be located in region 20. An arrangement of this type is shown in FIG. 6. As shown in FIG. 6, portion 16 of stylus 10 may include metal tube 150 (outer plastic tube 158 is not shown in FIG. 6). Region 20 may contain antenna structures supported by plastic inner support tube 164. For example, region 20 may contain antenna resonating element 106. Antenna resonating element 106 may have resonating element arm 108, return path 110, and feed path 112 with positive antenna feed terminal 98 and ground antenna feed terminal 100. Ground antenna feed terminal 100 may be coupled to metal tube 150, which may serve as antenna ground 104 for antenna 40.

End portion 22 of stylus 10 may be formed from metal structures (e.g., structure 25, which may be, for example, a metal connector that is configured to receive a mating plug). The presence of end portion 22 above antenna 40 may help reflect radio-frequency antenna signals from antenna 40 downwards in direction 160 towards tablet computer 120. As a result, the efficiency of antenna 40 may be greatest in a cone defined by dashed lines 162 (e.g., a cone having a spread of angle A and facing in direction 160). The value of A may be, for example, 20-160°, more than 40°, less than 130°, or other suitable value. Because antenna efficiency is enhanced in direction 160 (i.e., towards tablet computer 120), wireless communications link 28 between stylus 10 and tablet computer 120 can be maintained efficiently (i.e., power consumption from the battery in stylus 10 and the battery in table computer 120 can be minimized).

Figure 7:
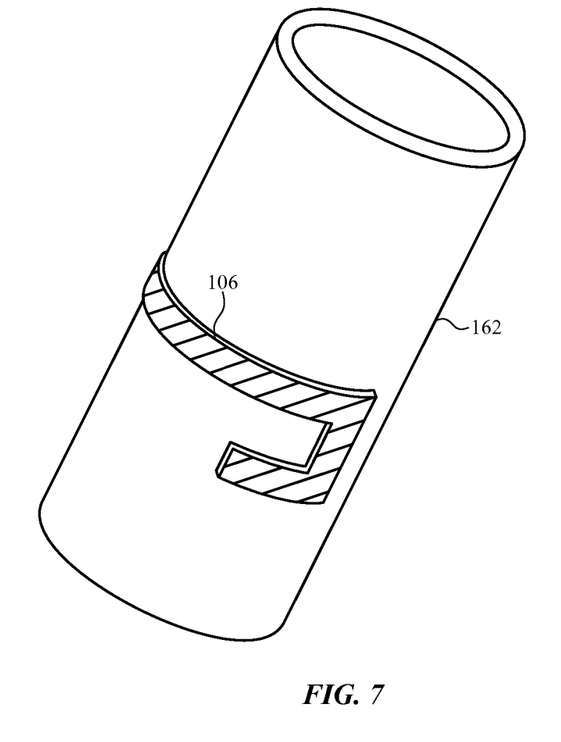
FIG. 7 is a perspective view of an illustrative antenna resonating element formed from a metal trace on a hollow plastic tube in accordance with an embodiment.

Antenna resonating element 106 may be formed from metal traces on the surface of support structure 164, as shown in FIG. 7. Traces for antenna resonating element 106 may, for example, be formed using laser-based patterning (e.g., laser-enhanced metal plating, laser etching, etc.). Traces for antenna resonating element 106 may also be deposited using ink jet printing (e.g., inkjet printing of metal paint), pad printing, screen printing, physical vapor deposition, etc.

Figure 8:
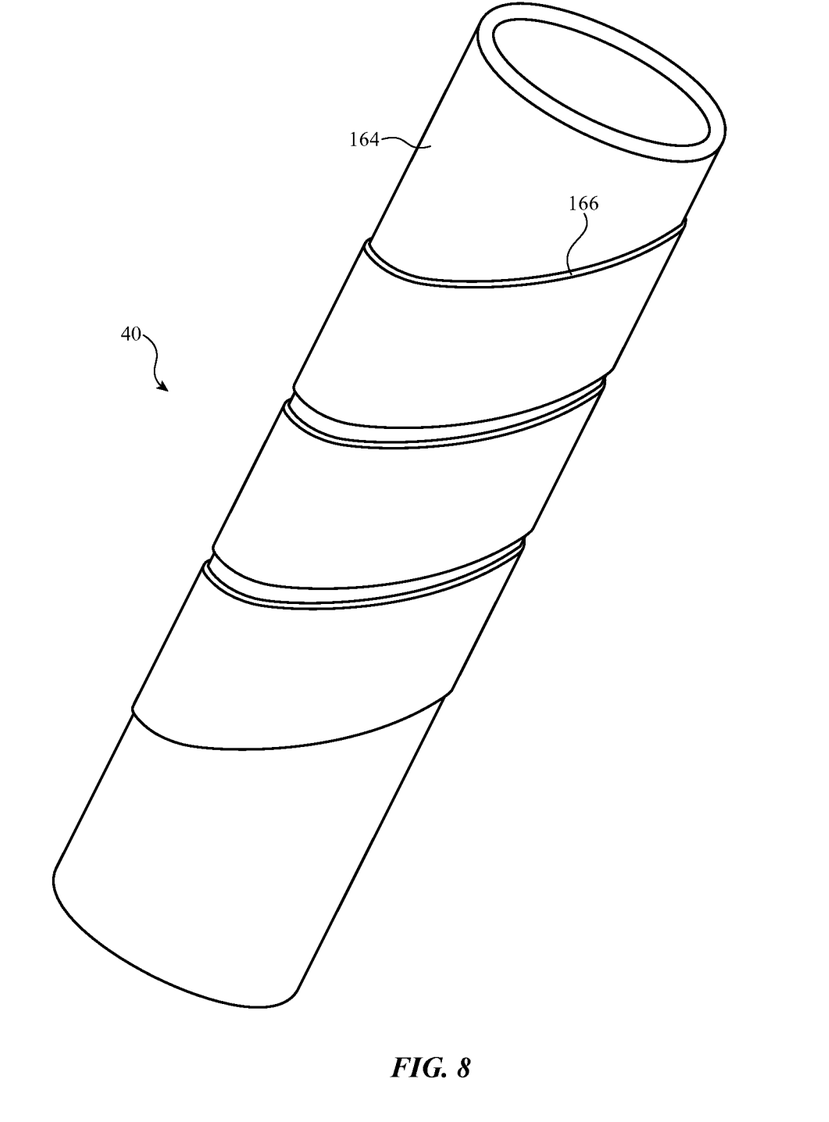
FIG. 8 is a perspective view of an illustrative antenna formed from a length of flexible printed circuit that has been wrapped around a plastic tube in a helix in accordance with an embodiment.

If desired, antenna resonating element 106 may be formed from metal traces on a printed circuit (e.g., a rigid printed circuit board or a flexible printed circuit). As shown in the illustrative configuration of FIG. 8, a flexible printed circuit such as flexible printed circuit 166 that contains metal traces for antenna resonating element 106 may be wrapped around support structure 164 in a helical pattern.

Figure 9:
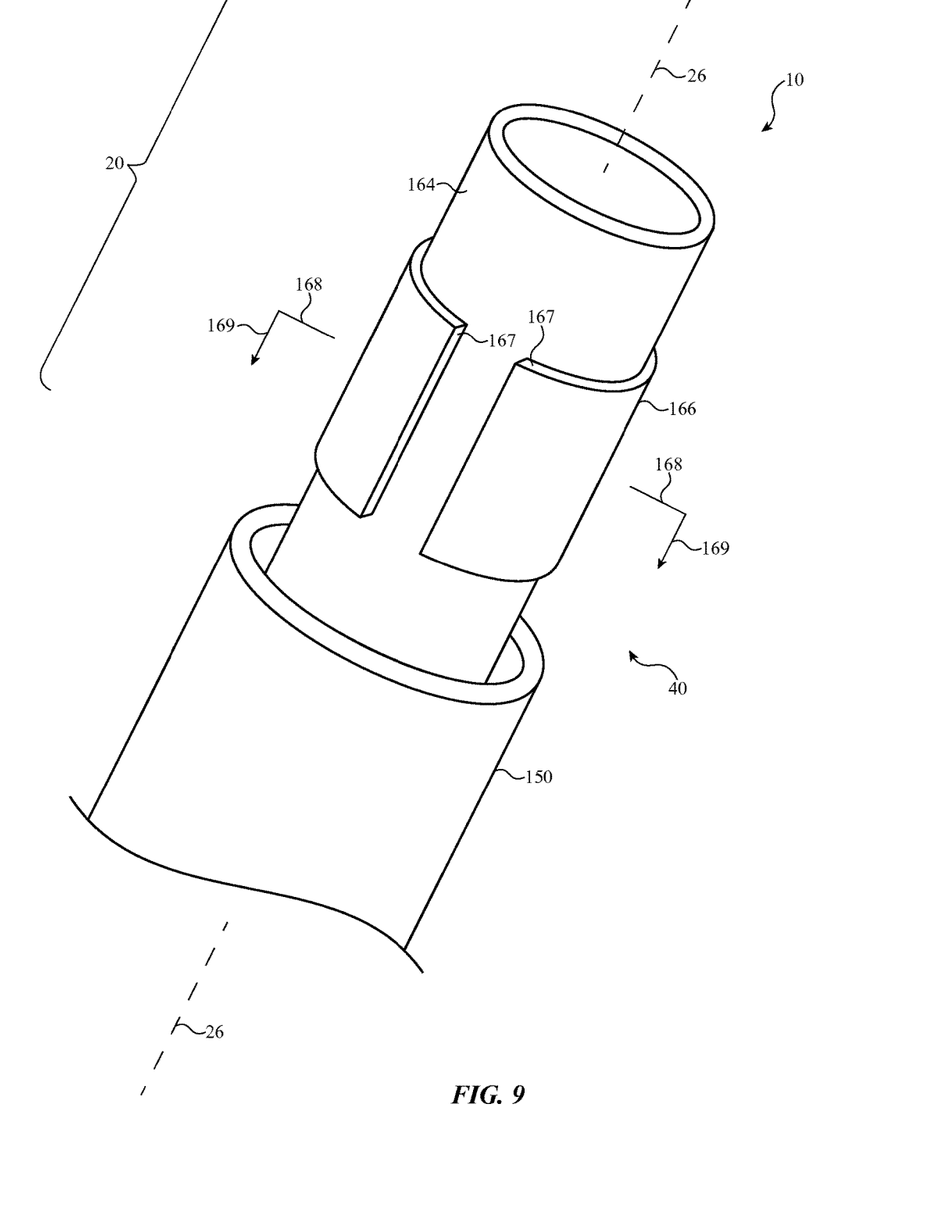
FIG. 9 is a perspective view of an illustrative antenna formed from a flexible printed circuit that has been wrapped around the circumference of a hollow plastic tube in accordance with an embodiment.

In the illustrative configuration of FIG. 9, flexible printed circuit 166 has been wrapped around the circumference of support structure 164 in the vicinity of metal tube 150 so that opposing ends 167 of flexible printed circuit 166 are adjacent to each other. In this configuration, metal traces in flexible printed circuit 166 may be used to from antenna resonating element 106 and metal tube 150 may be used to form antenna ground 104 (FIG. 4).

Figure 10:
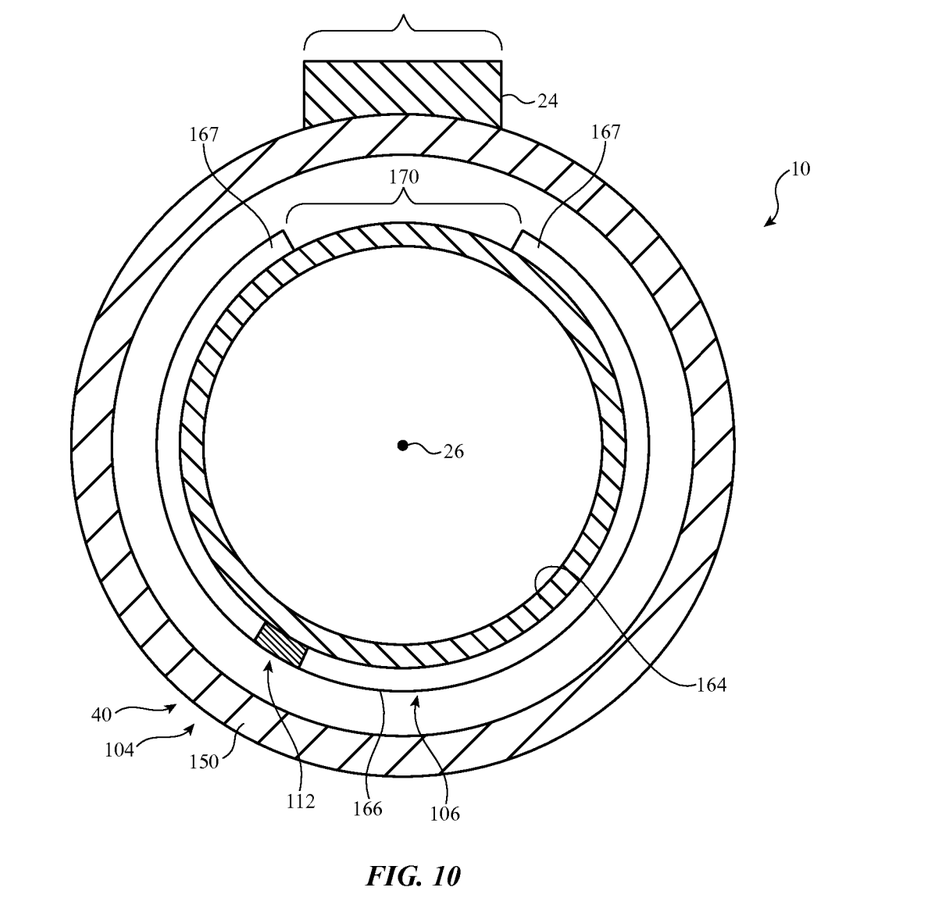
FIG. 10 is a cross-sectional view of an illustrative antenna formed from a flexible printed circuit that has been wrapped around the circumference of a hollow plastic tube in accordance with an embodiment.

A cross-sectional view of the structures of FIG. 9 taken along line 168 and viewed in direction 169 is shown in FIG. 10. Outer plastic member 158 of FIG. 5 is not shown in FIG. 10. Flexible printed circuit 166 contains metal traces patterned to form an antenna resonating element such as inverted-F antenna resonating element 106 of FIG. 4. Metal tube 150 may form antenna ground 104. Feed 112 for antenna 40 may be located on the opposing side of stylus 10 from clip 24 to minimize interference between clip 24 and antenna 40. Flexible printed circuit 166 may also be configured to form an opening or other region such as region 170 between ends 167 that is devoid of antenna traces for resonating element 106. Interference between clip 24 and antenna 40 may be minimized by mounting clip 24 to the elongated body of stylus 10 where clip 24 overlaps region 170. With this configuration, clip 24 does not overlap antenna resonating element 106 in flexible printed circuit 166 (i.e. clip 24 overlaps a region that is free of antenna resonating element traces).

Figure 11:
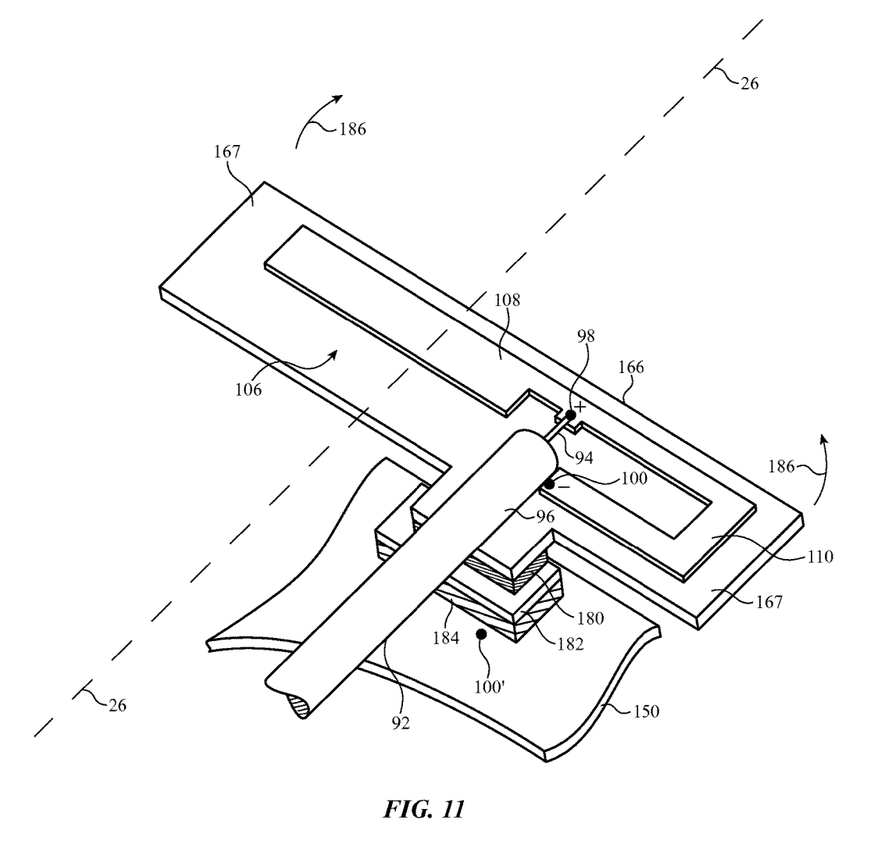
FIG. 11 is a perspective view of a flexible printed circuit with antenna traces and associated structures of the type that may be installed within a stylus in accordance with an embodiment.

In FIG. 11, flexible printed circuit 166 is shown in an unwrapped (flattened) state prior to wrapping around support structure 164 and installation within the tube-shaped housing of stylus 10. As shown in FIG. 11, flexible printed circuit 166 includes metal traces for forming antenna resonating element arm 108, return path 110, and an antenna feed having positive antenna feed terminal 98 and ground antenna feed terminal 100. A transmission line such as coaxial cable 92 may have a positive signal conductor such as line 94 that is soldered to terminal 98 and a ground signal conductor such as outer conductor 96 that is soldered to terminal 100. Terminal 100 may be shorted to terminal 100' on metal tube 150 via metal traces in printed circuit 166 (e.g., traces that form part of return path 110 and/or which are extensions to path 110), solder 180, a sheet metal member such as stainless steel shim 182, and a conductive material 184. Conductive material 184 may be conductive fabric, conductive adhesive, solder, welded material, or other conductive material for facilitating the formation of an electrical connection between metal member 182 and the antenna ground formed by the inner surface of metal tube 150. To assemble the structures of FIG. 11 into a finished stylus, printed circuit 166 may be wrapped around longitudinal axis 26 and support structures 164 in directions 186, as shown in FIGS. 9 and 10. Outer plastic tube 158 or other dielectric cover layer may then be used to cover printed circuit 166 and inner metal tube 150.

The foregoing is merely illustrative and various modifications can be made by those skilled in the art without departing from the scope and spirit of the described embodiments. The foregoing embodiments may be implemented individually or in any combination.

What is claimed is:

1. A computer stylus, comprising:
   an elongated body having a tip and an opposing end coupled by a shaft that is formed from a metal tube that extends along a longitudinal axis, wherein the elongated body includes a region devoid of the metal tube that extends around the longitudinal axis; and
   an antenna adjacent to the opposing end and mounted within the region of the elongated body devoid of the metal tube, wherein the antenna comprises an antenna resonating element formed from metal traces on a dielectric substrate having a circumference, an antenna ground that includes the metal tube, a positive antenna feed terminal coupled to the antenna resonating element, and a ground antenna feed terminal coupled to the antenna ground, the metal traces comprising a first portion that extends perpendicular to the longitudinal axis and along the circumference of the dielectric substrate and a second portion that extends parallel to the longitudinal axis and that is coupled between and end of the first portion and the antenna ground.

2. The computer stylus defined in claim 1 wherein the opposing end includes metal structures that reflect antenna signals associated with the antenna towards the tip.

3. The computer stylus defined in claim 2 wherein the antenna resonating element comprises an inverted-F antenna resonating element.

4. The computer stylus defined in claim 3 wherein the computer stylus further comprises a clip and the clip and the positive antenna feed terminal are located on opposing sides of the elongated body.

5. The computer stylus defined in claim 4 further comprising a plastic layer that covers the metal tube and the dielectric substrate.

6. The computer stylus defined in claim 5 further comprising a sheet metal member that shorts the ground antenna feed terminal to the metal tube.

7. The computer stylus defined in claim 6 further comprising conductive material that couples the sheet metal member to the metal tube.

8. The computer stylus defined in claim 7 wherein the conductive material comprises conductive fabric.

9. The computer stylus defined in claim 8 further comprising solder that couples the ground antenna feed terminal to the sheet metal member.

10. The computer stylus defined in claim 9 further comprising a force sensor in the tip and an accelerometer.

11. The computer stylus defined in claim 1 further comprising a sheet metal member coupled between the ground antenna feed terminal and the metal tube.

12. The computer stylus defined in claim 11 further comprising solder that couples the return path to the sheet metal member.

13. The computer stylus defined in claim 12 further comprising metal structures that reflect antenna signals from the antenna towards the tip, wherein the metal structures and the tip are located at opposing ends of the elongated body.

14. The computer stylus defined in claim 1,
wherein the dielectric substrate comprises a cylindrical plastic tube that encloses the longitudinal axis.

15. The computer stylus defined in claim 14, wherein the metal traces are patterned directly onto the cylindrical plastic tube.

16. The computer stylus defined in claim 15, wherein the metal traces are patterned directly onto the cylindrical plastic tube using laser-based patterning.

17. The computer stylus defined in claim 1, wherein the region devoid of the metal tube is interposed between the metal tube and the opposing end.

18. The computer stylus defined in claim 1 wherein the region devoid of the metal tube extends completely around the longitudinal axis and the first portion of the metal traces extend around at least 180 degrees of the circumference.

19. The computer stylus defined in claim 1, further comprising:
a sensor at the opposing end of the elongated body.

20. The computer stylus defined in claim 19, further comprising an additional sensor in the tip.

21. The computer stylus defined in claim 20, wherein the sensor comprises a force sensor.

22. The computer stylus defined in claim 1, wherein the metal traces further comprise a third portion that extends from the ground antenna feed terminal to the second portion of the metal traces, the third portion extending parallel to the first portion of the of the metal traces.

* * * * *